United States Patent Office 3,806,549
Patented Apr. 23, 1974

3,806,549
METHOD OF PREPARING ORGANOOXY SILANES
Kevin M. Foley, Hebron, Ohio, assignor to Owens-Corning Fiberglas Corporation
No Drawing. Filed Nov. 3, 1971, Ser. No. 195,457
Int. Cl. C07f 7/04, 7/18
U.S. Cl. 260—448.8 R                14 Claims

ABSTRACT OF THE DISCLOSURE

Halogen and amine groups attached to silicon are replaced by organooxy groups. The replacement is carried out with the reactants dissolved in pentane. Substantially quantitative distilled yields are obtained, and the reaction can be preceded or followed by other reactions carried out in the pentane media. For example, trichlorosilane is reacted with an organo material containing halogen and an olefinic unsaturate. The silane hydrogen is reacted with the olefinic unsaturate, in a first stage reaction; the chlorines attached to the silicon are replaced by ethoxy groups in a second stage reaction; and then the halogen of the organo material is replaced by amine in a third stage reaction, all in the pentane media. All this is accomplished without an HCl scavenger.

BACKGROUND OF THE INVENTION

The prior art processes with which I am aware for replacing halogen or amine groups attached to silicon by organooxy groups, produce yields that are only approximately fifty percent of theoretical unless amines are used to scavenge HCl when liberated. By way of example, trichlorosilane and ethanol diluted in benzene give a yield of approximately 39 percent of theoretical. The same is true using toluene and other prior art solvents with which I am aware. As part of these processes, therefore, it is necessary to distill or otherwise remove the reactants, scavenging agents, and other impurities that are formed from the desired product. In the prior art processes, an appreciable amount of siloxane is produced during the reaction and during the distillation.

The precurser for many of the organosilanes presently produced are halogenated silanes and usually chlorinated silanes. Organo groups can be coupled to the silicon atoms by the reaction of silane hydrogen with an olefinic double bond. The product is usually purified by distillation and thereafter the halogens that are attached to the silicon are replaced by organooxy groups such as alkoxy or aryloxy groups in a second stage reaction. Because of the poor yield that is obtained during the alkoxy or aryloxy formation, another distillation step is required before substitutions can be made on organo groups attached to the silicon atoms. Because the organooxy substitutions of the prior art give numerous impurities and because of the elevated temperature used in the distillation step, a considerable amount of siloxane is formed and this further decreases the yield. By the time that the prior art has carried out all of the reaction and distillations above referred to, the yield of the product produced is at best a very small percentage of theoretical.

The principal object of the present invention is the provision of a new and improved process for replacing halogens or amine groups attached to a silicon atom by organooxy groups without using scavenging agents, and in a manner giving better yields than have been possible with prior art processes.

Further objects and advantages will become apparent to those skilled in the art from the following description of the preferred embodiments.

DESCRIPTION OF THE PREFERRED EMBODIMENTS

The prior art has carried out the reaction between a halogenated silane and an alcohol as a solution of various organic solvents including benzene, toluene, ethers, etc. In all reported processes with which I am aware wherein a trihalosilane is reacted with an alcohol without using a scavenging agent, the yield of trialkoxysilane produced has been less than quantitative and in most cases below approximately 50% of theoretical. In the reaction of trichlorosilane and ethanol, the prior art has found it necessary to keep the reaction time short, i.e. approximately 1 minute, but even using these precautions the yields obtained were not more than approximately 50%.

According to the present invention it has been discovered that when the reaction is carried out in pentane that almost theoretical yields can be obtained. Normally pentane is not as good a solvent as is benzene, toluene or the ethers, nevertheless, improved results are had. It appears that when a trihalosilane such as trichlorosilane or tribromosilane is used as a starting material, the trialkoxysilane and triaryloxysilane is formed without producing tetraalkoxysilane or tetraaryloxysilane as occurs in prior art processes. Also it has been found that the hydrogen chloride scavengers used in prior art processes are not necessary when the reaction is carried out in pentane. It further appears that the pentane media can be used as a media for reacting silane hydrogen with an olefin. This is usually carried out before reacting the silane with alcohol, and when this is performed in a pentane media no purification or distillation is necessary between the two reactions. It has further been found that subsequent reactions can also be carried out in pentane, so that the trialkoxysilane or triaryloxysilane product can be left in the pentane for these reactions. In fact the product need never be distilled, since the pentane solution is compatible with most materials that are normally used in a coating for glass fibers.

EXAMPLE 1

A 0.5707 gram mole portion of trichlorosilane was placed in a 1,000 ml. flask, together with 450 ml. of pentane. A reflux condenser was installed on the flask together with an addition funnel, and 1.712 moles of ethanol in 100 ml. of pentane was added to the addition funnel. The ethanol solution was slowly added to the flask over a period of 47 minutes. The contents of the flask were heated to refluxing conditions. To determine the yield and purity, the contents of the flask were distilled and found to have 77.3 grams of $(CH_3CH_2O)_3SiH$ (0.7405 mole) having a boiling point of 128° C. to 132° C.

EXAMPLE 2

The process of Example 1 was repeated excepting that

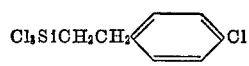

was substituted for the trichlorosilane and the product

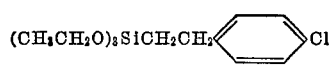

was obtained in a 88.2% yield.

EXAMPLE 3

The process of Example 1 was repeated excepting that methanol was substituted for the ethanol and (CH₃O)₃SiH was obtained in a 82% yield.

EXAMPLE 4

The process of Example 1 was repeated excepting that methyl Cellosolve (CH₃OCH₂CH₂OH) was substituted for the ethanol and the product (CH₃OCH₂CH₂O)₃SiH was obtained in a 88% yield.

EXAMPLE 5

The process of Example 1 was repeated excepting that phenol was used in place of the ethanol and the reaction product

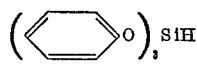

was obtained in approximately a 80% yield.

Also according to the invention the pentane environment is highly beneficial for carrying out a reaction between the hydrogen of the silane and an olefinic double bond of an organo material desired to be connected to the silicon atom of the silane.

EXAMPLE 6

0.5 mole of trichlorosilane is placed in a 1,000 ml. flask with 450 mls. of pentane. The flask is equipped with a reflux condenser. A couple drops of chloroplatinic acid is added. Acetylene gas is bubbled through the pentane solution. An approximately 100% yield of Cl₃SiCH=CH₂ is produced. The system is purged with nitrogen, and 0.5 mole of chlorobenzene dissolved in 100 mls. of pentane is added to the flask using reflux. A substantially 100% yield of

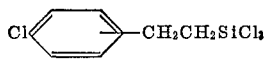

is produced. Thereafter, 1.5 moles of ethanol dissolved in 100 mls. of pentane is added to the flask using reflux over a period of approximately 15 minutes, and the product

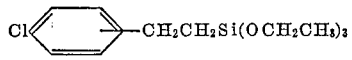

is produced with an 80% yield based on the original amount of trichlorosilane used.

EXAMPLE 7

0.5 mole of trichlorosilane is placed in a 1,000 ml. flask together with 0.5 mole of allylchloride. A couple drops of chloroplatinic acid is then added. The system is then purged with nitrogen and heated to reflux for four hours. 1.8 moles of methanol is then added to the flask. A 63% yield of chloropropyltrimethoxysilane is obtained on distillation.

Thereafter, the entire contents of the reaction flask are placed in a pressure vessel together with 5 moles of ammonia. This is then heated to 100° C. for 15 hours. The contents are then cooled transferred to distillation equipment and distilled to give 23.1 grams of aminopropyltrimethoxysilane.

EXAMPLE 8

A 0.5 mole sample of trichlorosilane is placed in a 1,000 ml. flask together with 450 mls. of pentane and the flask is equipped with a reflux condenser. A couple drops of chloroplatinic acid is added to the contents of the flask, and 0.5 mole of styrene is added to the flask under refluxing conditions over a period of 40 minutes. An 80% yield of

is obtained.

EXAMPLE 9

The process of Example 8 is repeated excepting that subsequent to the reaction of the styrene 1.5 moles of ethanol in 100 mls. of pentane are added to the flask over a period of 40 minutes using reflux to produce the product,

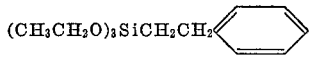

in an approximate 80% yield.

EXAMPLE 10

The process of Example 9 is repeated excepting that pentene-2 is used in place of styrene. The product (CH₃CH₂O)₃SiCH₂CH₂CH₂CH₂CH₃ is obtained in an approximately 95% yield. This reaction shows that chloroplatinic acid is an isomerization catalyst which causes some pentene-1 to be present, and pentene-1 is selectively reacted with the hydrogen on the silicon atom.

EXAMPLE 11

The process of Example 1 is repeated excepting that the trichlorosilane is replaced by trimethylamino silane, and only 0.58 mole of ethanol was used. Ammonia was liberated and the product CH₃CH₂OSi(CH₃)₃ is obtained in approximately an 80% yield.

EXAMPLE 12

A 1.0 gram mole sample of divinylbenzene was placed in a 1,000 ml. flask together with 200 ml. of pentane, and 0.6 ml. of a solution containing 1.0 gram of chloroplatinic acid dissolved in 20 ml. of isopropanol. The flask was equipped with a reflux condenser, and 0.504 mole of trichlorosilane were slowly added thereto and heated with reflux over a period of 16 hours. The product was thereafter distilled to obtain a 0.282 gram mole product of B - Trichlorosilylethylvinylbenzene boiling at 110° C. to 114° C. at 0.7 millimeter of mercury pressure. This is a 56% yield.

When the reaction was duplicated excepting that pentane was omitted, extensive polymerization occurred, the materials solidified in the flask, and no B-Trichlorosilylethylvinylbenzene could be obtained.

EXAMPLE 13

A 0.1054 gram mole sample of the B-Trichlorosilylethylvinylbenzene produced in Example 12 was placed in a flask together with 40 mls. of pentane. The flask was equipped with a reflux condenser and a solution of 0.358 gram mole of methanol dispersed in 10 mls. of pentane was slowly added with refluxing. After refluxing for 1 hour, distillation gave 0.0258 gram mole of B-Trimethoxysilylethylvinylbenzene boiling at 98° to 120° C. at 0.4 mm. of mercury pressure. This is approximately a 24% yield which is remarkable in view of the high reactivity of the vinylbenzene adduct.

Any type of aminosilane or halogen silane can be used in the process. For example, iodosilane, bromosilane, and chlorosilane, and particularly the trihalogen silanes can be used as a starting material.

Any material having an OH group attached thereto can be used as a source of hydrogen to replace the halogen or amine group attached to the silicon atom. Preferred materials are the alcohols having no more than 20 carbon atoms. These materials may contain functional groups, as for example ether, oxygen, amine groups, halogen groups, olefinic double bonds, aryl groups, OH groups, etc. As shown above, phenol can be used although it is not a preferred material because the reaction product liberates phenol during hydrolysis and this may be objectionable for some uses. The higher molecular weight alcohols can be used inasmuch as their solubility in pentane increases with molecular weight.

Substantially any organo material having an olefinic double bond or acetylenic triple bond can be reacted with silane hydrogen in the presence of pentane. These organo materials having olefinic double bonds or acetylenic triple bonds can have other than hydrocarbon groups as a part thereof. These groups can include carboxyl groups, aryl groups, amine groups, halogen groups, etc. Even though these groups are reactive, the reaction of silane hydrogen with the double or triple bond proceeds at such a low temperature in pentane that it proceeds in preference to a reaction of substantially any other functional group including an oxirane group. What is more, the alkoxy or aryloxy production by the displacement of halogen attached to silicon proceeds in pentane so easily and completely that this step can be carried out even though other functionality exists on the reactant containing the OH group. Substantially any free radical catalyst can be used for the reaction of silane hydrogen with an olefinic double bond. Where the reactant has a double bond in various positions and a substitution in the alpha position only is desired, chloroplatinic acid is the preferred catalyst.

EXAMPLE 14

0.667 mole (121.56 gram) of 1-tridecene was placed in a one liter flask equipped with reflux condenser and 0.5 gram of benzoyl peroxide catalyst was added thereto. Thereafter 0.7616 mole of trichlorosilane was slowly added with reflux keeping the contents of the flask above 130° C. The heating was continued for approximately 2½ hours at which time the pot temperature reached 200° C. and the pot was thereafter allowed to cool to room temperature. 200 milliliters of pentane was then added to the pot and 2.668 mole (309.6 milliliters) of diethylene glycol monomethyl ether dissolved in 200 milliliters of pentane were added slowly with stirring. The pot was heated to refluxing conditions during the addition, and the heating was continued for 1 hour and 50 minutes. The reaction solution was distilled to give 332.4 grams of a material having a boiling point of 220° C. and having the formula

$$CH_3(CH_2)_{12}Si(OCH_2CH_2OCH_2CH_2OCH_3)_3.$$

The yield of this material was 87.6%. Although triethoxysilanes having an organo group of 13 carbon atoms are not soluble in water and must be emulsified, the product given above is soluble in typical aqueous sizes.

EXAMPLE 15

The process of Example 14 was repeated excepting that the product was not distilled. A size for glass fibers was made of the following materials:

| Material | Grams |
| --- | --- |
| Reaction solution of Example 14 | 60 |
| Isopropanol | 60 |
| Polyethylene emulsion—20% solids (Quaker Quasoft HS60) | 480 |
| Deionized water | 3400 |

This material was applied to glass fibers at forming and gave complete wetout without nonwetted areas, usually called "fish eyes." This is surprising since the silane has a hydrocarbon 13 carbons long attached thereto. Heretofore trialkoxysilanes having alkoxy groups of more than approximately 4 carbon atoms have had to be dispersed with an emulsifying agent and these emulsified materials did not give complete and uniform fiber coverage. The silane coupling agent did not separate from the size solution on standing as sometimes occurs with prior art silanes because of hydrolysis and siloxane formation. The silane of Example 14 does not appear to form siloxanes even after standing for 7 days. It is theorized that any diethylene glycol monomethyl alcohol formed on hydrolysis hydrogen bonds to the silanes and hinders the siloxane formation. The sized fibers produced had a good lubricious feel and had low running tensions when pulled over guide eyes.

EXAMPLE 16

4 moles of benzene, 8 moles of vinyltrichlorosilane and 20 grams of ammonium chloride were reacted together under refluxing conditions for 16 hours. 2500 milliliters of pentane were then added, followed by 27.21 moles of methanol in 1550 ml. of pentane. The reaction solution was distilled to give a 0.5036 mole (12.6%) of B-trimethoxysilylethylbenzene boiling from 90–95° C. at 0.9 mm., and 1.489 moles (37.2%) of bis (B-trimethoxysilylethyl) benzene boiling from 173–182° C. at 0.8 mm.

A size for glass fibers was produced according to Example 15 excepting that the reaction solution of Example 15 was substituted for the reaction solution of Example 14. This material was applied to a sliver of glass fibers 0.00035″ in diameter grouped to give 1500 yds./1 pound and the coated fibers were coiled into a package which was then dried at 265° F. for 16 hours. These fibers were then coated with an impregnate material having the following composition according to Pat. 3,567,671:

| Material: | Parts by weight |
| --- | --- |
| Water | 930 |
| Sodium hydroxide | 1 |
| Resorcinol formaldehyde latex (75% solids) | 48 |
| Ammonium hydroxide (26° Bé.) | 8 |
| Formaldehyde (37% solids) | 16 |
| Vinyl-pyridine, styrene, butadiene terpolymer latex (41% solids) | 900 |
| Vinyl chloride, vinylidene chloride copolymer latex (50% solids) | 350 |
| Paraffin wax emulsion (55% solids) | 200 |

The coated fibers were dried in an oven heated to 510° F. for 1 minute. Three coated slivers were twisted together into strands and 6 inch lengths of this strand were laid side by side in touching engagement between two layers of 20 mil thick styrene-butadiene rubber sheet stock. The sandwich was placed in a mold heated to 350° F. and pressed at 100 p.s.i. for 20 minutes. The sandwich was 1 inch wide and it required a force of 68.6 pounds to pull the rubber layers from the impregnated strands.

As pointed out above, the organosilane product, for example, alkoxy or aryloxy product, can be left dissolved in the pentane solution to undergo a further reaction of the organo portion attached to the silicon atom. Many of these products, and particularly the higher molecular weight organo products are soluble in the pentane, while water and HCl are not appreciably soluble in the pentane, so that a reaction product kept in the pentane media has prolonged shelf life. What is more, the organo-silane products dissolved in the pentane can be used as a glass coupling agent without separation from the pentane since a dilute solution of the organosilane will usually be desired to aid in the wetting out of the surface of the glass. In addition, pentane has a sufficiently low chain length that it is soluble in the lower molecular weight prepolymer materials that are used in the sizing ingredients for glass fibers. The pentane solution of the reaction products of the method of the present invention, therefore, can be used as a size ingredient for application to glass fibers without further treatment, distillation, etc.

It will be seen that the present invention has utility in several types of reaction wherein it improves yields and permits successive reactions without purification of the products after each reaction. The invention has particular advantage in replacing halogen and amine groups from silicon atoms of an organo silicon material with an organooxy group. The organosilicon material can be any monomer or polymer soluble in pentane. The silicon atom thereof can be the sole silicon atom of the compound or can be one of a number of silicon atoms connected by organo groups or oxygen atoms. Preferred organooxy groups are those obtained by the removal of hydrogen from an alcohol or a phenolic material. Therefore one aspect of the invention is indicated by the production of the following radical: $(XO)_{4-n}Si-$ wherein: $n$ is 1 to 3 and XO is an organooxy group preferably obtained from an alcohol or a phenol reacting with the radical: $(Y)_{4-n}Si-$ wherein: Y is a halogen or amine group.

One large class of products made by the reaction of the invention is: $(XO)_{4-n}SiZ_n$ wherein: Z is an organo group preferably having functionality for coupling to organic resins. This functionality will include olefinic double bonds, oxirane groups, amino groups, carboxyl groups and alcohol groups.

While the invention has been described in considerable detail, I do not wish to be limited to the particular embodiments described, and it is my intention to cover hereby all novel adaptations, modifications, and arrangements thereof which come within the practice of those skilled in the art to which the invention relates.

I claim:

1. The process of replacing a radical from the group consisting of halogen and amine from a silicon atom to produce an $Si(OX)_n$ radical comprising: dispersing a material having the radical $Si(Y)_n$ in pentane along with a material consisting of alcohols and phenols having its formula XOH and refluxing the pentane solution at atmospheric pressure, Y being the halogen or amine radical and XO being the radical of the alcohol or phenol.

2. The process of claim 1 wherein Y is a halogen radical.

3. The process of claim 2 wherein XOH is ethanol, and the material produced has the radical $(C_2H_5O)_3Si-$.

4. The process of claim 2 wherein XOH is methanol, and the material produced has the radical $(CH_3O)_3Si-$.

5. The process of claim 2 wherein XOH is $CH_3OCH_2CH_2OH$ and the material produced has the radical $(CH_3OCH_2CH_2O)_3Si-$ 6. The process of claim 2 wherein XOH is $CH_3OCH_2CH_2OCH_2CH_2OH$ and the material produced has the radical $(CH_3OCH_2CH_2OCH_2CH_2O)_3Si-$ 7. The process of producing organosilane coupling agents from unsaturated material comprising: reacting a material having an olefinic double bond with a chlorosilane or aminosilane while dispersed in pentane, and thereafter refluxing an organo compound having an OH radical with the reaction product dispersed in the pentane at atmospheric pressure to replace the halogen or amine group attached to the silicon atom with an organooxy group.

8. The process of claim 7 wherein chloroplatinic acid is used as a catalyst during the reaction of the compound having the olefinic double bond with the hydrogen donor.

9. The process of claim 7 wherein the compound having the olefinic double bond is dissolved in the pentane and is refluxed, and the silane is slowly added thereto.

10. The process of claim 9 wherein the compound is a polyunsaturate.

11. The process of claim 7 wherein the unsaturated compound is divinylbenzene.

12. The process of producing organosilane coupling agents from unsaturated materials comprising: reacting a halogenated organo compound having an olefinic double bond with a halogenated hydrogen silane while dispersed throughout pentane to produce the reaction product dispersed throughout the pentane, refluxing an organo compound having an OH radical with the pentane dispersion of said reaction product at atmospheric pressure to replace the halogen attached directly to the silicon atom with organooxy groups, and reacting ammonia with the pentane dispersion of the second reaction product to displace the halogen of said organo compound.

13. The process of claim 12 wherein a chloroalkene is first reacted with trichlorosilane, and the reaction product is reacted with an alcohol to give aminoalkyl trialkoxysilane, all in the pentane solution.

14. The process of claim 2 wherein a material having the formula

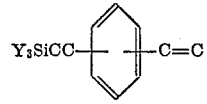

is reacted with an alcohol to give

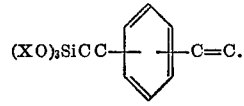

References Cited

UNITED STATES PATENTS

| 3,448,138 | 6/1969 | DeWit | 260—448.8 R |
| 3,008,975 | 11/1961 | Schubert | 260—448.8 R |
| 3,651,117 | 3/1972 | Bennett | 260—448.8 R |
| 3,546,267 | 12/1970 | Ismail | 260—448.8 R |
| 3,525,764 | 8/1970 | Kotzsch et al. | 260—448.8 R |
| 3,522,284 | 7/1970 | Kotzsch | 260—448.8 R |
| 3,492,328 | 1/1970 | Kotzsch | 260—448.8 A |
| 2,823,218 | 2/1958 | Speier et al. | 260—448.8 R |
| 2,626,272 | 1/1953 | Speier | 260—448.8 R |
| 2,632,013 | 3/1953 | Wagner et al. | 260—448.8 RX |
| 2,970,150 | 1/1961 | Bailey | 260—448.8 RX |

PATRICK P. GARVIN, Primary Examiner

P. F. SHAVER, Assistant Examiner

U.S. Cl. X.R.

106—287 SB, 316; 260—448.8 A